United States Patent [19]
Peterson et al.

[11] Patent Number: 5,529,128
[45] Date of Patent: Jun. 25, 1996

[54] HIGH SPEED ROW CROP CULTIVATOR

[75] Inventors: Richard L. Peterson, LeSueur; James A. Johnson, Cologne; Vincent J. Tomlonovic, North Mankato, all of Minn.

[73] Assignee: Hiniker Company, Mankato, Minn.

[21] Appl. No.: 285,258

[22] Filed: Aug. 3, 1994

[51] Int. Cl.⁶ ............................ A01B 39/08; A01B 39/14
[52] U.S. Cl. ..................... 172/145; 172/166; 172/624.5
[58] Field of Search ........................... 111/52, 135, 136, 111/139, 140, 152, 156, 924, 925, 926, 927; 172/145, 166, 158, 900, 624.5, 509

[56] References Cited

U.S. PATENT DOCUMENTS

| | | |
|---|---|---|
| 1,698,019 | 10/1927 | Howell et al. . |
| 2,420,551 | 11/1944 | Morkoski . |
| 2,440,174 | 12/1944 | Howard . |
| 2,949,968 | 8/1960 | Stoner .................................. 172/166 |
| 3,621,922 | 11/1971 | Hinken . |
| 3,708,019 | 1/1973 | Ryan ............................. 172/624.5 X |
| 4,054,007 | 10/1977 | Moore . |
| 4,298,071 | 11/1981 | Whitfield et al. ..................... 172/624 |
| 4,317,489 | 3/1982 | Steinback ............................. 172/400 |
| 4,461,355 | 7/1984 | Peterson et al. . |
| 4,538,532 | 9/1985 | Coker . |
| 4,560,011 | 12/1985 | Peterson et al. . |
| 4,601,248 | 7/1986 | Beasley . |
| 4,623,024 | 11/1986 | Schlenker ....................... 172/624.5 X |
| 4,834,189 | 5/1989 | Peterson et al. . |
| 4,905,770 | 3/1990 | Hanig ................................... 172/509 |
| 5,163,518 | 11/1992 | Foley ............................. 172/624.5 X |

OTHER PUBLICATIONS

Kinze 5000 Brochure.
Hiniker 5000 Brochure.
Orthman 5000 Brochure.

*Primary Examiner*—Terry Lee Melius
*Assistant Examiner*—Robert Pezzuto
*Attorney, Agent, or Firm*—Reising, Ethington, Barnard & Perry

[57] ABSTRACT

The row crop cultivator includes a cultivation unit (10) with a unit frame (12) attached to a tool bar (21) by parallel links (28 and 34). The unit frame (12) is supported by a pair of gauge wheels (14 and 16). A disk coulter (18) is mounted on the unit frame (12) with its forward edge positioned between the gauge wheels (14 and 16). A middleworker (20) is supported by the unit frame (20) directly behind the disk coulter (18). The gauge wheels (14 and 16) are mounted on an axle assembly (90) that includes gauge wheel arms (92 and 94) and a force equalizing link (98). The force equalizing link (98) equalizes the force exerted on the two gauge wheels (14 and 16) by the unit frame (12). An adjustment rod (106) adjusts the position of the force equalizing link. A coulter adjustment rod (54) with a lost motion connection adjusts the maximum depth of the disk coulter. The middleworker (20) includes a shank attachment bar (152), a triangular horizontal plate (164) with a subsoil point (160) and two reversible shares (170 and 172).

17 Claims, 4 Drawing Sheets

HIGH SPEED ROW CROP CULTIVATOR

BACKGROUND OF THE INVENTION

1. Field of the Invention

This invention relates to a row crop cultivator and a method of cultivating between rows of growing plants and, more particularly, to a cultivator and a method of cultivation with improved crop residue severing to reduce plugging, an improved middle worker and rapid adjustments.

2. Prior Art

Row crop cultivators were very important farm implements in the 1940s and 1950s for cultivating between rows of crops such as corn and soybeans. These implements continued to be manufactured in the '60s and '70s and occasionally a new row crop cultivator would be designed. The cultivators manufactured during those years had some common characteristics. They generally had a unit frame with a single gauge wheel, a disk coulter behind the gauge wheel, a middleworker behind the disk coulter and a provision for fenders or skirts to protect plants growing in the crop rows from soil thrown laterally by soil engaging tools. Space was provided between the gauge wheels and the coulter and between the coulter and the middleworker to allow residue lifted by the gauge wheel and by the coulter to fall back to the ground and to reduce plugging. A variety of tools were employed as middleworkers. The most common middleworker tool was a one piece V-shaped sweep commonly employed on field cultivators and chisel plows. The spacing between the three primary ground engaging components of each row unit resulted in the center of gravity of each row unit being spaced to the rear of a supporting tool bar some distance. The rear center of gravity problem could be accommodated when mounting some row cultivation units on the front of a tractor and others on the rear of a tractor. The center of gravity problem could also be handled by row crop cultivators that cultivated up to six rows on each pass through a field. The center of gravity location cannot be accommodated today with row crop cultivators cultivating twelve or more rows on each pass through a field. A tractor does not have sufficient weight to handle an old style row crop cultivator with twelve or more row units attached to a tractor-mounted rear tool bar.

The long row units were incapable of handling more than a minimal amount of residue on the surface of the ground. Until recent years, old crop residue on the surface of a field was not a problem. Moldboard plows turned residue under leaving the surface of a field relatively clean. Today, residue is generally left on the surface to reduce erosion, conserve moisture, and reduce cultivation costs. The old row crop cultivators could not handle the residue and would plug.

The sweeps used for middleworkers on old row crop cultivators tend to compress moist soil and residue into slabs and throw the slabs onto rows of growing crops. To prevent the slabs from killing plants in crop rows, fenders were provided. Row crop cultivators with long row units and fenders could not be pulled at speeds above about 3 or possibly 4 miles per hour without killing some plants growing in the crop rows.

The problems described above have, over the years, substantially reduced the use of row crop cultivators. Economics have dictated the use of primary tillage implements that leave trash or residue on the surface. Because of high surface residue and the high cost of cultivating growing crops at a slow speed, farmers have switched to chemicals for controlling weeds and grasses.

U.S. Pat. No. 4,834,189 on a row crop cultivator issued May 30, 1989 to the applicants of the improved row crop cultivator described below. This patent, which was based upon the Hiniker 5000 row crop cultivator, discloses a gauge wheel and disk coulter arrangement that can handle high residue conditions and a middleworker that substantially eliminates slabbing. The individual row units are short and compact making it possible to mount row units to cultivate 12 or more rows in one pass through the field. The cultivator also has an improved middleworker. These improvements incorporated in the Hiniker 5000 row crop cultivator have resulted in an implement capable of cultivating at 7 miles per hour or more without significant damage to a growing crop. The Hiniker 5000 row crop cultivator has given farmers an alternative to relatively expensive chemicals and in many cases the ability to reduce production costs. As a result, the Hiniker 5000 row crop cultivator has been very successful.

SUMMARY OF THE INVENTION

An object of this invention is to provide a row crop cultivator with improved residue handling capability. Another object of the invention is to provide a row crop cultivator with an improved middleworker. A further object of the invention is to provide a disk coulter that can raise up to a higher level without raising a middleworker when heavy soils or obstructions are encountered. A still further object of the invention is to provide a middleworker with simplified construction, increased strength and improved soil penetration. Another further object of the invention is to provide a row crop cultivator with simplified rapid adjustments.

The row crop cultivator row unit has a unit frame that is attached to a tool bar by parallel links. A pair of spaced-apart gauge wheels are mounted on the unit frame by an axle assembly. The axle assembly includes two gauge wheel arms pivotally attached to the unit frame. A gauge wheel is journaled on the lower end of each of the gauge wheel arms. A force equalizer bar inter-connects the two gauge wheel arms and equalizes the downward force exerted on each gauge wheel by the unit frame. The force equalizer bar is moveable to a plurality of positions to adjust the height of the unit frame relative to the gauge wheels. An adjustment lever holds the coulter support arms in any one of a plurality of positions relative to the unit frame. A lost motion connection in the coulter adjustment lever allows the disk coulter to move up against a spring force upon contacting an obstruction or hard soil conditions without lifting the unit frame.

The disk coulter extends between the two gauge wheels and penetrates the soil initially at a point between the two gauge wheels and generally in line with and between the areas on the ground that are in contact with the gauge wheels. This allows the disk coulter to cut through residue that is held by both gauge wheels with equal force on both sides of the coulter.

The middleworker has a sweep support assembly with a vertical shank attachment bar. A generally triangular, horizontal plate is attached to the bottom of the shank attaching bar. A pair of share attachment flanges are integral with the sides of the triangular horizontal plate. A nose plate extends forward and down from the shank attachment bar. A sub-soil point is attached to the nose plate. Reversible shares are attached to the share attachment flanges and extend outward and rearward from the sides of the subsoil point. The construction with the triangular horizontal plate forms an exceptionally strong, light weight and simple middleworker.

The vertical shank attachment bar is attached to a shank mounted on the unit frame and extending downward and to the rear from the unit frame.

The foregoing and other objects, features and advantages of the present invention will become apparent in the light of the following detailed description of an exemplary embodiment thereof, as illustrated in the accompanying drawing.

BRIEF DESCRIPTION OF THE DRAWING

FIG. 6 is an enlarged expanded view of a gauge wheel.

DETAILED DESCRIPTION

Figure 1:
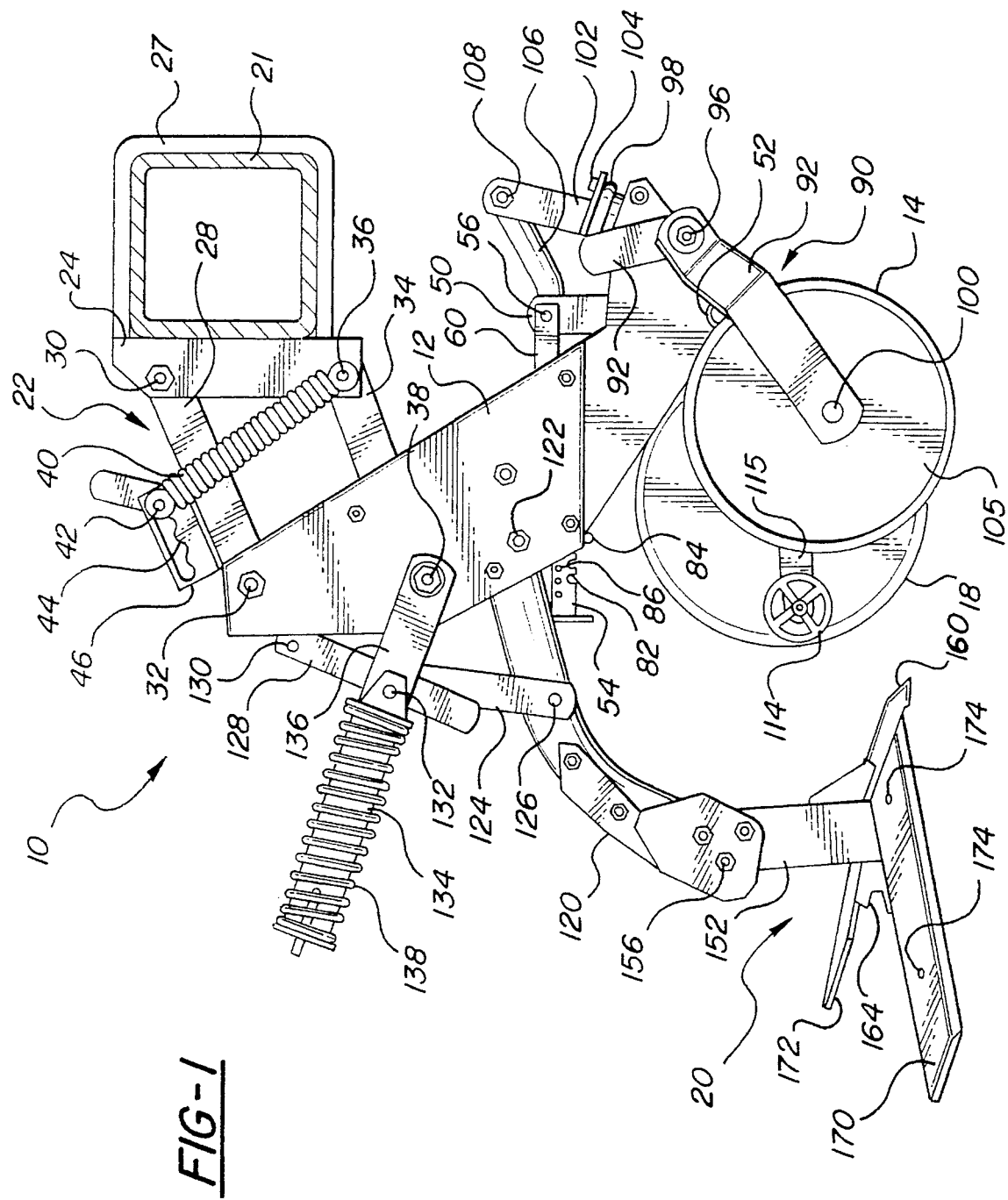
FIG. 1 is a side elevational view of the right side of a cultivation unit.

The row crop cultivator cultivation unit 10 shown in FIG. 1 has a unit frame 12, a pair of gauge wheels 14 and 16, a disk coulter 18 and a middleworker 20. The unit frame 12 is attached to a tractor mounted tool bar 21 by a suspension linkage 22. The suspension linkage 22 includes a pair of parallel spaced apart vertical angle members 24 and 26. The angle members 24 and 26 are clamped to a tool bar by U-bolts 27. An upper parallel link 28 is pivotally attached between the angle members 24 and 26 for pivotal movement about the horizontal transverse axis of a bolt 30. The bolt 30 passes through both angle members 24 and 26 and through the upper parallel link 28. The upper parallel link 28 is also attached to the unit frame 12 for pivotal movement about the axis of a bolt 32 that passes through the unit frame 12. A lower parallel link 34 is pivotally attached between the angle members 24 and 26 for pivotal movement about the horizontal transverse axis of a bolt 36. The bolt 36 passes through both angle members 24 and 26 and through the lower parallel link 34. The lower parallel link 34 is also attached to the unit frame for pivotal movement about the horizontal axis of a bolt 38 that passes through the unit frame 12. The suspension linkage 22 allows the unit frame 12 to move up and down relative to a tool bar 21 that the cultivator unit 10 is attached to.

A pair of tension springs 40 have lower ends attached to the bolt 36. The upper ends of the tension springs 40 are attached to a rod 42. The center of the rod 42 rests in one of a series of notches 44 in two spaced apart plates 46 secured to the upper surface of the upper parallel link 28. The springs 40 exert a downward force on the unit frame 12. By moving the rod 42 to a notch 44 closer to the bolt 32, the downward force on the unit frame 12 can be increased. By moving the rod 42 to a notch 44 that is further from the bolt 32, the downward force on the unit frame 12 can be decreased.

Figure 2:
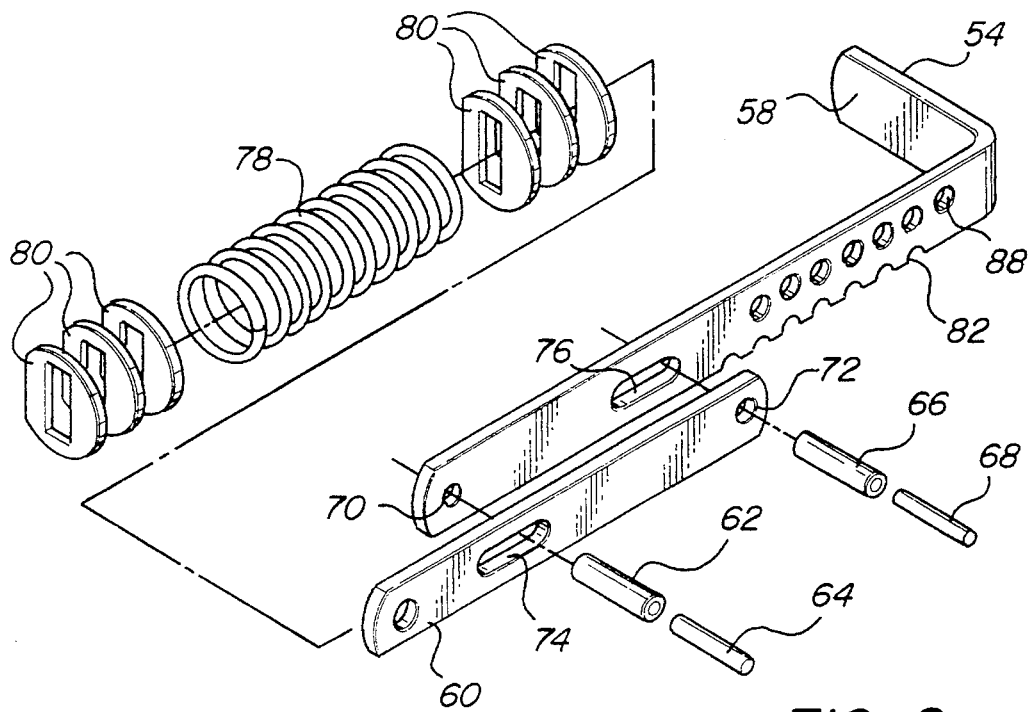
FIG. 2 is an enlarged and expanded view of the coulter adjustment rod.
Figure 3:
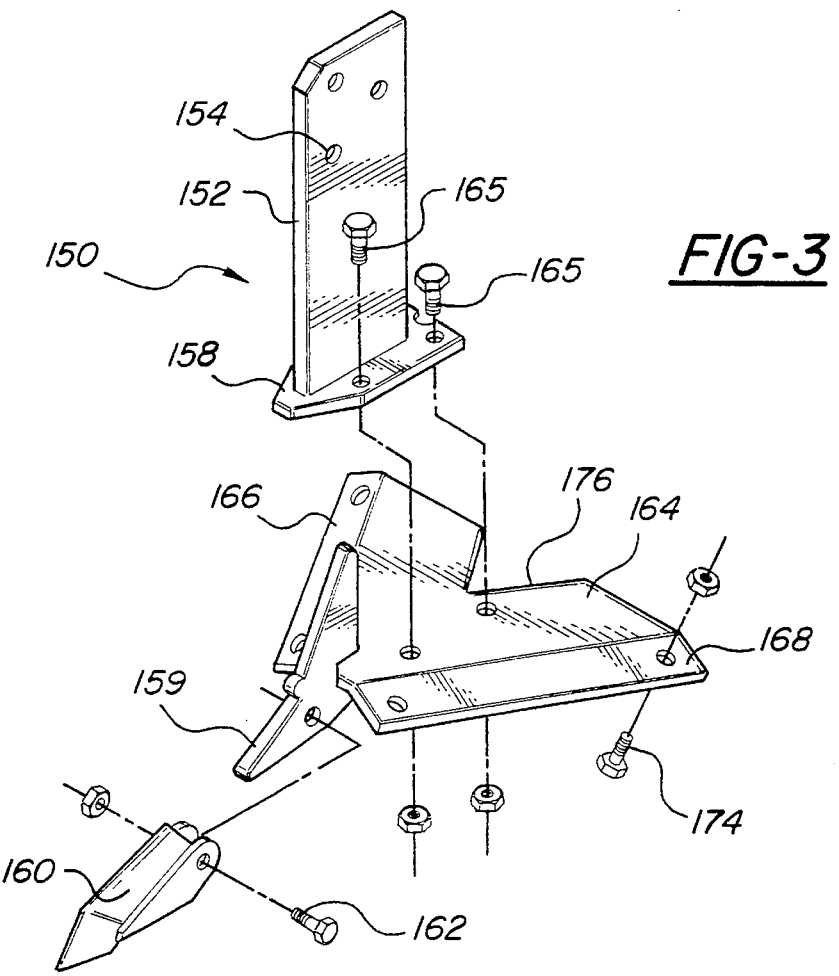
FIG. 3 is an enlarged and expanded view of the middleworker.
Figure 4:
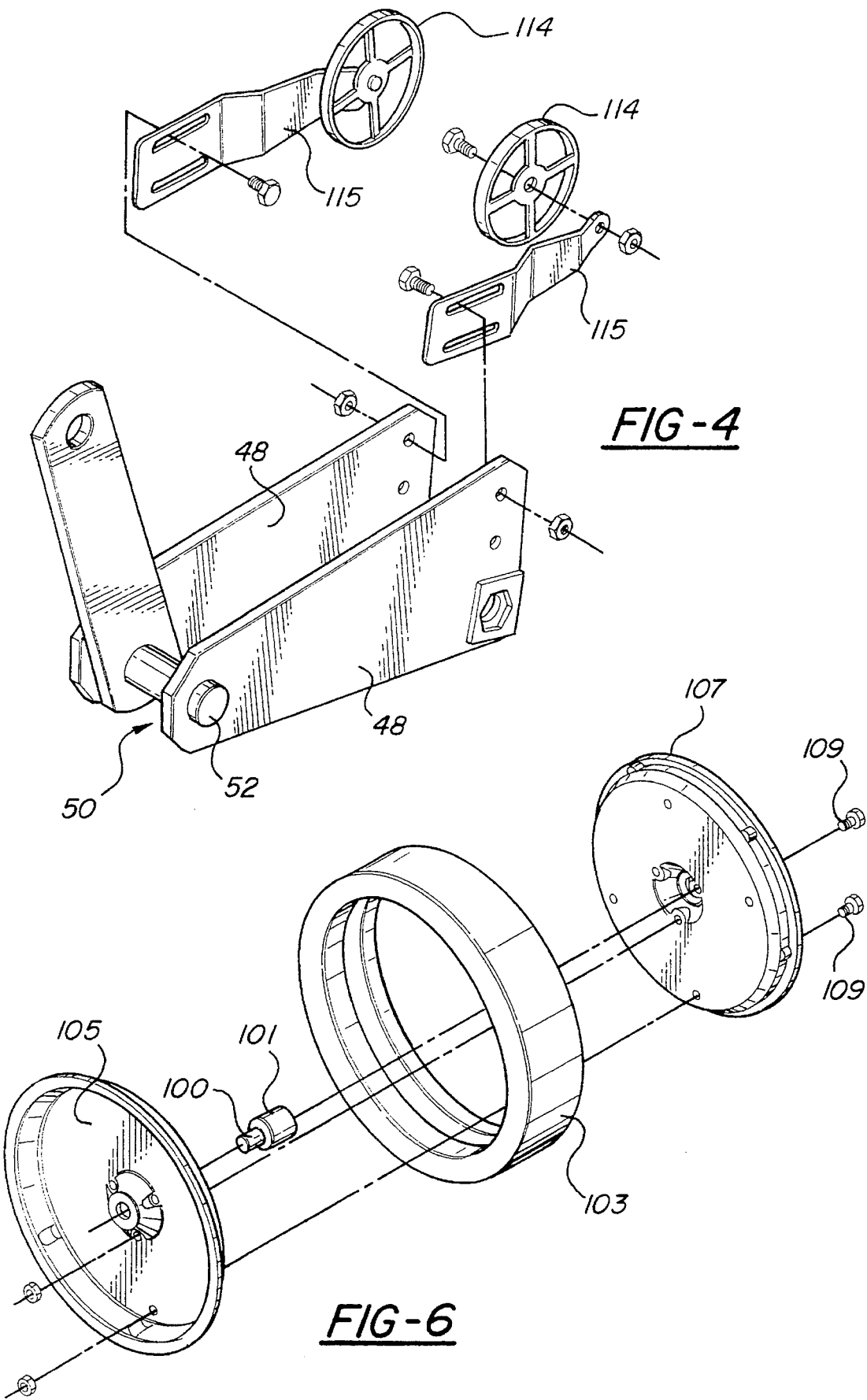
FIG. 4 is an enlarged and expanded view of the coulter scrapers.
Figure 5:
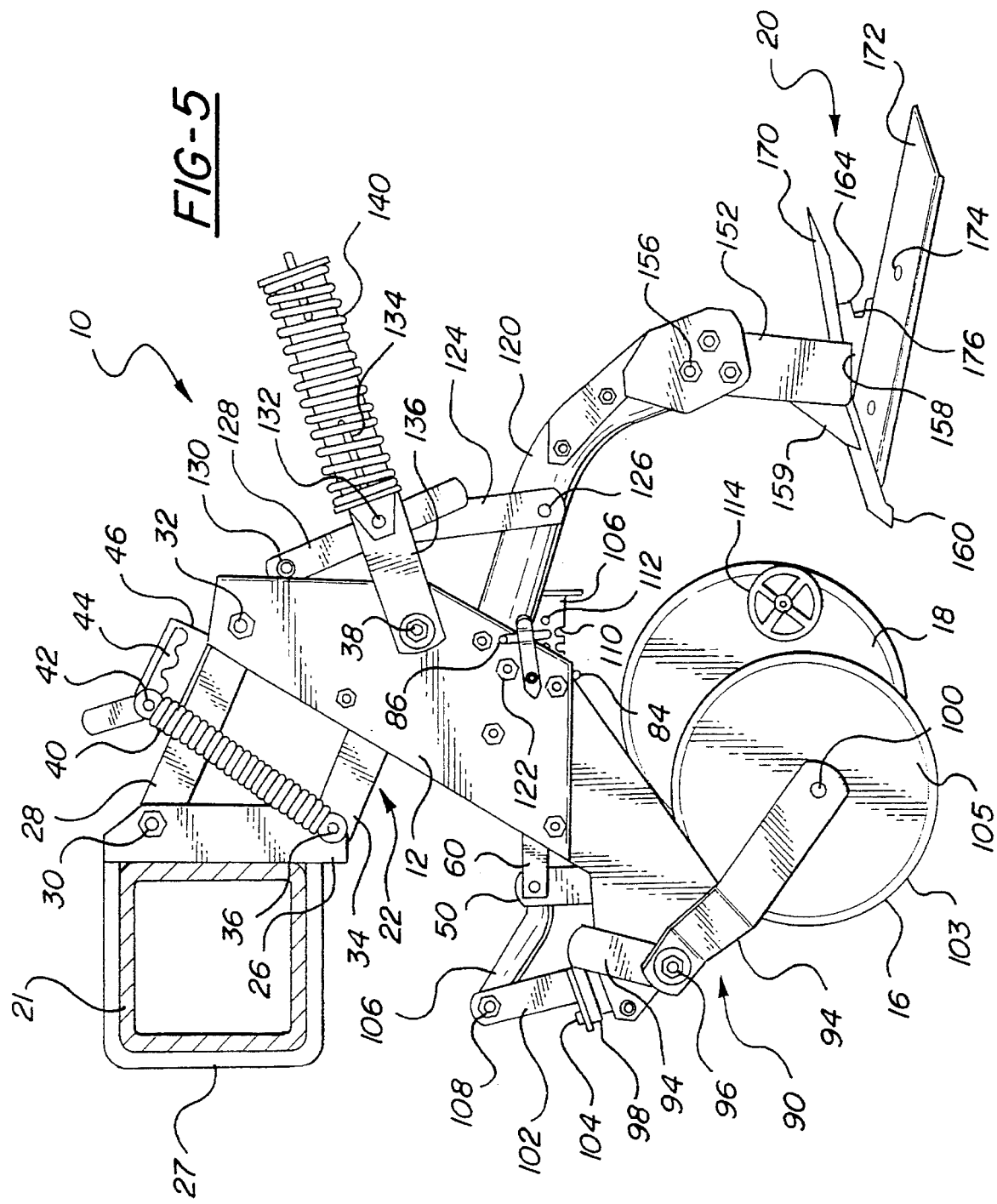
FIG. 5 is a side elevational view of the left side of a cultivating unit with parts broken away to show hidden parts.

The disk coulter 18 is journaled between a pair of coulter support plates 48 shown in FIG. 4. The coulter support plates 48 are one end of a coulter bell crank 50. The coulter bell crank 50 is pivotally supported in the unit frame 12 by a shaft 52 that is integral with the coulter bell crank. The upper end of the coulter bell crank 50 is attached to a coulter adjustment rod 54 by a bolt 56. The coulter adjustment rod 54, as shown in FIG. 2, includes a handle portion 58 and a forward portion 60. The handle portion 58 and the forward portion 60 are attached to each other by pins 62, 64, 66 and 68 that pass through circular apertures 70 and 72 and through slots 74 and 76 in the handle portion 58 and the forward portion 60 of the coulter adjustment rod 54. A compression spring 78 encircles the coulter adjustment rod 54 and is compressed between adjusting washers 80 and the pins 62 and 66. The slots 74 and 76 allow the coulter adjustment rod 54 to lengthen, compress the compression spring 78 and thereby allowing the disk coulter 18 to roll up and over an obstruction or hard soil without raising the unit frame 12. The ability of the disk coulter 18 to raise independently from the unit frame improves cultivation in fields with soft soils in some places and harder soils in other places. A series of notches 82 engage the shaft 84 welded into the unit frame 12 to set the depth of the disk coulter 18. The depth is adjusted by lifting the free end of the coulter adjustment rod 54 from engagement with the shaft 84, moving the adjustment rod 54 forward or to the rear until the disk coulter is set at the correct depth and then lowering the adjustment rod 54 until one of the notches 82 engages the shaft 84. A pin 86 is then inserted into one of the apertures 88 to lock the coulter adjustment rod 54 in engagement with the shaft 84.

Gauge wheels 14 and 16 are journaled on an axle assembly 90. The axle assembly 90 includes gauge wheel arms 92 and 94 that are pivotally attached to the unit frame 12 for pivotal movement about the axis of a bolt 96. Upper extensions of the gauge wheel arms 92 and 94 contact a force equalizing link 98 that limits pivotal movement of the gauge wheel arms 92 and 94 about the axis of the bolt 96. The gauge wheels 14 and 16, one of which is shown in FIG. 6, have a shaft 100 rotatably journaled in an outer race 101 secured in their central hub. Each gauge wheel 14 and 16 includes a rubber tire 103 with a rounded tread surface. The outer race 101 and the rubber tire 103 are clamped between two wheel halves 105 and 107 that are secured to each other by bolts 109. The shaft 100 is inserted into a bore in one of the gauge wheel arms 92 or 94 and is locked in position. The gauge wheel 14 is on the right side of the disk coulter 18 and the gauge wheel 16 is on the left side of the disk coulter. The gauge wheel arms 92 and 94 are formed to position the bottom of each gauge wheel 14 or 16 adjacent to one side of the point at which the front of the disk coulter 18 engages the ground. In this location, both gauge wheels are in contact with the majority of residue when the residue is engaged by the disk coulter 18 and severed. The gauge wheel arms 92 and 94 hold the gauge wheels in a position in which they are closer together at the bottom than at the top. In this position the gauge wheels 14 and 16 hold residue closer to the disk coulter 18. The force equalizing link 98 is part of the axle assembly 90 and equalizes the force exerted upon the gauge wheels 14 and 16 so that they both hold residue and trash to the ground with equal force when the residue and trash is engaged and severed by the disk coulter 18. The force equalizing link 98 is pivotally connected to a lift arm 102 by a generally vertical bolt 104. The lift arm 102 is pivotally attached to the unit frame 12 for pivotal movement about the axis of bolt 96. An adjustment rod 106 is pivotally attached to the lift arm 102 by a bolt 108. The adjustment rod 106 is moved fore and aft to pivot the lift arm 102 about the axis of the bolt 96 until the force equalizing link 98 cooperates with gauge wheels 14 and 16 to hold the unit frame 12 at the desired height above the ground. The adjustment rod 106 is then lowered until notches 110 in the adjustment rod engage the shaft 84. The pin 86 is then inserted through an aperture 112 in the adjustment rod 106 to lock the adjustment rod in engagement with the shaft 84.

Scraper wheels 114, shown in FIGS. 1 and 4, can be supported adjacent to the rear portion of each side of the disk coulter 18 to scrape mud from the disk coulter in muddy and wet conditions. Scraper wheels 114 need not be used in normal or dry soil conditions. Supporting the gauge wheels 14 and 16 at an angle as described above provides space for supports 115 for the scraper wheels 114.

The shank 120 is pivotally attached to the unit frame 12 for pivotal movement about the axis of bolt 122. A lower toggle link assembly 124 is pivotally attached to the shank 120 by a pin 126. An upper toggle link assembly 128 is pivotally attached to the unit frame 12 by a pin 130. The lower and upper toggle link assemblies 124 and 128 are pivotally attached to each other by a shaft 132. The shaft 132 passes through slots 134 in a pair of bars 136. The bars 136 are pivotally attached to the unit frame 12 by a bolt 38. Compression springs 138 and 140 on the bars 136 bias the shaft 132 toward the end of the slots 134 adjacent to the bolt 38. If the middleworker 20 contacts an obstruction, the shank 120 pivots up about the axis of the bolt 122 and the shaft 132 moves in the slots 134 away from the bolt 38 and compresses the compression springs 138 and 140. After the middleworker 20 passes the obstruction, the compression springs 138 and 140 return the shank 20 to its original position shown in the drawings.

The middleworker 20 includes a sweep support assembly 150 with a vertical shank attachment bar 152. The bar 152 has apertures 154 that receive bolts 156 to attach the middleworker 20 to the shank 120. A horizontal plate 158 is welded to the bottom of the shank attachment bar 152. A nose plate 159 is attached to and extends downward and forward from the forward lower surface of the bar 152. A subsoil point 160 is attached to the nose plate 159 by a bolt 162. A generally triangular horizontal plate 164 is secured to the horizontal plate 158 by bolts 165. The triangular horizontal plate 164 has share attachment flanges 166 and 168 integral with its forward edges. Reversible shares 170 and 172 are secured to the share attachment flanges 166 and 168 by bolts 174. Shares 170 and 172 with different lengths can be used to adjust for different crop row spacing. A V-shaped cutout 176 is provided in the rear of the triangular horizontal plate 164.

The preferred embodiment of the invention has been described in detail, but is an example only and the invention is not restricted thereto. It will be easily understood by those skilled in the art that modifications and variations can easily be made within the scope of this invention.

We claim:

1. A method of cultivating soil between parallel rows of growing plants with a cultivation unit that is propelled by a tractor including:

advancing said cultivation unit between two parallel rows of growing plants in a direction parallel to the parallel rows;

holding old crop residue on the ground between the parallel rows of growing plants at two slightly spaced apart locations;

equalizing a holding force exerted on the old crop residue between the two slightly spaced apart locations;

severing the old crop residue while it is being held; and cultivating soil between the parallel rows of growing plants under the severed old crop residue.

2. A method of cultivating soil between parallel rows of growing plants as set forth in claim 1 further including maintaining a substantially uniform depth of soil cultivation.

3. A method of cultivating soil between parallel rows of growing plants as set forth in claim 1 wherein the locations in which old crop residue is held are transversely spaced from each other relative to the direction of advancement of said cultivation unit.

4. A method of cultivating soil between parallel rows of growing plants as set forth in claim 1 wherein the old crop residue is severed between the two locations where the equalized holding force is exerted on the old crop residue.

5. A row crop cultivation unit having a unit frame adapted to be connected to a tractor mounted tool bar by a parallel linkage that permits vertical movement of the unit frame relative to the tool bar;

a gauge wheel mounted on the unit frame for controlling the unit frame height relative to soil being cultivated;

a disk coulter journaled on a bell crank that is pivotally attached to the unit frame;

a link, attached to the bell crank and the unit frame, having a lost motion joint with a spring bias that permits the disk coulter to move upward relative to the unit frame; and an earth working tool supported by the unit frame to the rear of the disk coulter.

6. A row crop cultivation unit, as set forth in claim 5, wherein the link attached to the bell crank can be released from the frame, the bell crank and the attached disk coulter can be pivoted about an axis of the pivotal attachment between the bell crank and the unit frame and the link attached to the bell crank can be reattached to the unit frame to reposition the disk coulter and the bell crank in a selected position relative to the unit frame.

7. A row crop cultivation unit, as set forth in claim 5, wherein the link attached to the bell crank has a plurality of notches that selectively engage a surface on the unit frame to set the lowest position of the disk coulter relative to the unit frame.

8. A row crop cultivation unit, as set forth in claim 7, including a lock for locking one of said plurality of notches in the link attached to the bell crank in contact with a surface on the unit frame.

9. A row crop cultivation unit, as set forth in claim 5, wherein the gauge wheel is adjustably mounted on the unit frame and further including a gauge wheel adjustment rod connected to the gauge wheel, and a plurality of notches in the adjustment rod, one of which engages a surface on the unit frame to hold the gauge wheel in a fixed position relative to the unit frame.

10. A row crop cultivation unit, as set forth in claim 9, including a lock for locking one of said plurality of notches in the adjustment rod in contact with a surface on the unit frame.

11. A middleworker, for a row crop cultivator including:

a shank attachment bar with a nose plate portion;

a generally triangular horizontal plate secured to the bottom of the shank attachment bar;

a first share attachment flange integral with the generally triangular horizontal plate;

a second share attachment flange integral with the generally triangular horizontal plate;

a subsoil point attached to the nose plate portion and extending downward and forward to a position forward of and below the generally triangular horizontal plate; and a share clamped to each said share attachment flange and extending outwardly and rearwardly from a position adjacent to a side of the subsoil point.

12. A middleworker, as set forth in claim 11, wherein the shares are reversible.

13. A middleworker as set forth in claim 12 wherein the generally triangular horizontal plate is secured to the bottom of the shank attachment bar by bolts.

14. A middleworker as set forth in claim 11, including a horizontal plate attached to the bottom of the shank attachment bar and wherein the generally triangular horizontal plate is attached to the said horizontal plate by bolts.

15. A middleworker as set forth in claim 11 wherein the shank attachment bar is connected to a shank, said shank is attached to a unit frame and said unit frame is attached to a tool bar by parallel links.

16. A middleworker as set forth in claim 15 including at least one spring that biases the middleworker down relative to said tool bar.

17. A middleworker as set forth in claim 16 including a gauge wheel mounted on the unit frame to control the depth of soil penetration by the middleworker.

* * * * *